US012378390B2

United States Patent
Herd et al.

(10) Patent No.: US 12,378,390 B2
(45) Date of Patent: Aug. 5, 2025

(54) METHODS FOR IMPROVING NANOCELLULOSE DISPERSION IN ELASTOMERIC COMPOUNDS, AND COMPOSITIONS CONTAINING DISPERSED NANOCELLULOSE IN ELASTOMER COMPOUNDS

(71) Applicants: BIRLA CARBON U.S.A., INC., Marietta, GA (US); GRANBIO INTELLECTUAL PROPERTY HOLDINGS, LLC, Thomaston, GA (US)

(72) Inventors: Charles R. Herd, Woodstock, GA (US); Zachary A. Combs, Smyrna, GA (US); Lewis B. Tunnicliffe, Woodstock, GA (US); Kimberly Nelson, Atlanta, GA (US); Shaobo Pan, Atlanta, GA (US)

(73) Assignees: BIRLA CARBON U.S.A., INC., Marietta, GA (US); GRANBIO INTELLECTUAL PROPERTY HOLDINGS, LLC, Thomaston, GA (US)

( * ) Notice: Subject to any disclaimer, the term of this patent is extended or adjusted under 35 U.S.C. 154(b) by 1037 days.

(21) Appl. No.: 17/285,600

(22) PCT Filed: Oct. 21, 2019

(86) PCT No.: PCT/US2019/057225
§ 371 (c)(1),
(2) Date: Apr. 15, 2021

(87) PCT Pub. No.: WO2020/086466
PCT Pub. Date: Apr. 30, 2020

(65) Prior Publication Data
US 2021/0395493 A1 Dec. 23, 2021

Related U.S. Application Data

(60) Provisional application No. 62/748,564, filed on Oct. 22, 2018, provisional application No. 62/748,574, filed on Oct. 22, 2018.

(51) Int. Cl.
*C08L 9/06* (2006.01)
*B60C 1/00* (2006.01)
(Continued)

(52) U.S. Cl.
CPC .............. *C08L 9/06* (2013.01); *B60C 1/0016* (2013.01); *C08K 3/04* (2013.01); *C08K 5/01* (2013.01);
(Continued)

(58) Field of Classification Search
CPC ...... C08L 9/06; C08L 1/02; C08L 7/00; C08L 91/06; C08L 2201/50; C08L 2201/52;
(Continued)

(56) References Cited

U.S. PATENT DOCUMENTS 9,688,846 B2  6/2017 Kim
11,014,405 B2  5/2021 Sato
(Continued)

FOREIGN PATENT DOCUMENTS

CN  112969752 A  6/2021
EP  2703186 B1  4/2015
(Continued)

OTHER PUBLICATIONS

Caixin et al. "Effects of partial replacement of carbon black with nanocrystalline cellulose on properties of natural rubber nanocomposites." J. of Polymer Engineering, vol. 38, No. 2 (Feb. 2018), pp. 137-146.
(Continued)

*Primary Examiner* — Ling Siu Cho
*Assistant Examiner* — Ronald Grinsted
(74) *Attorney, Agent, or Firm* — Merchant & Gould P.C.

(57) ABSTRACT

Nanocellulose dispersion compositions containing a partitioning agent and a nanocellulose, and methods of making the nanocellulose dispersion compositions, are disclosed. These compositions can promote improved dispersibility of the nanocellulose fibrils and nanocellulose crystals in polymer matrices, such as in elastomer formulations for use in tire production.

30 Claims, 6 Drawing Sheets

(51) Int. Cl.
*C08K 3/04* (2006.01)
*C08K 5/01* (2006.01)
*C08K 7/02* (2006.01)
*C08K 9/04* (2006.01)
*C08L 1/02* (2006.01)
*C08L 7/00* (2006.01)
*C08L 91/06* (2006.01)

(52) U.S. Cl.
CPC ............... *C08K 7/02* (2013.01); *C08K 9/04* (2013.01); *C08L 1/02* (2013.01); *C08L 7/00* (2013.01); *C08L 91/06* (2013.01); *B60C 1/00* (2013.01); *C08K 2201/006* (2013.01); *C08K 2201/011* (2013.01); *C08L 2201/50* (2013.01); *C08L 2201/52* (2013.01); *C08L 2205/035* (2013.01); *C08L 2205/16* (2013.01); *C08L 2205/22* (2013.01); *C08L 2207/322* (2013.01)

(58) Field of Classification Search
CPC .......... C08L 2205/035; C08L 2205/16; C08L 2205/22; C08L 2207/322; B60C 1/0016; B60C 1/00; C08K 3/04; C08K 5/01; C08K 7/02; C08K 9/04; C08K 2201/006; C08K 2201/011
USPC .......................................................... 524/35
See application file for complete search history.

(56) References Cited

U.S. PATENT DOCUMENTS

| | | |
|---|---|---|
| 12,152,132 B2 | 11/2024 | Sakai et al. |
| 2016/0122515 A1* | 5/2016 | Karampelas .............. C08L 1/04 106/204.3 |
| 2016/0152811 A1 | 6/2016 | Gardner et al. |
| 2017/0321045 A1 | 11/2017 | Vargantwar et al. |
| 2017/0333602 A1 | 11/2017 | Amiralian et al. |
| 2018/0016402 A1 | 1/2018 | Miyazaki et al. |
| 2018/0244806 A1 | 8/2018 | Yoshida et al. |
| 2020/0109269 A1 | 4/2020 | Hirabayashi |
| 2023/0071816 A1 | 3/2023 | Herd et al. |

FOREIGN PATENT DOCUMENTS

| | | |
|---|---|---|
| EP | 2975077 A1 | 1/2016 |
| EP | 3255082 A1 | 12/2017 |
| EP | 3431543 A1 | 1/2019 |
| EP | 3757159 | 12/2020 |
| JP | 2015221855 A | 12/2015 |
| JP | 2017014358 A | 1/2017 |
| JP | 2020055962 A | 4/2020 |
| WO | 2016/090425 A1 | 6/2016 |
| WO | 2016/136453 A1 | 9/2016 |
| WO | 2020/086419 A1 | 4/2020 |

OTHER PUBLICATIONS

International Search Report for International Application No. PCT/US2019/057225 mailed Feb. 3, 2020 (3 pages).
International Written Opinion for International Application No. PCT/US2019/057225 mailed Feb. 3, 2020 (16 pages).
PCT International Search Report for PCT Application No. PCT/US2021/018564 mailed Jun. 10, 2021 (3 pages).
PCT Written Opinion for PCT Application No. PCT/US2021/018564 mailed Jun. 10, 2021 (4 pages).

* cited by examiner

METHODS FOR IMPROVING NANOCELLULOSE DISPERSION IN ELASTOMERIC COMPOUNDS, AND COMPOSITIONS CONTAINING DISPERSED NANOCELLULOSE IN ELASTOMER COMPOUNDS

REFERENCE TO RELATED APPLICATIONS

This application is a National stage of PCT International application No. PCT/US2019/057225, filed on 21 Oct. 2019, which claims the benefit of U.S. Provisional Patent Application Nos. 62/748,564 and 62/748,574, both filed on 22 Oct. 2018, and which applications are incorporated herein by reference in their entirety. To the extent appropriate, a claim of priority is made to each of the above disclosed applications.

TECHNICAL FIELD

The present disclosure relates to a process for improving the dispersion of nanocellulose and to a resulting nanocellulose dispersion composition for use in polymer formulations, and more particularly, for use in elastomeric formulations intended for tires and other end-use applications.

BACKGROUND

Nanocellulose has received much attention lately as a nano-material with many different potential uses, such as in plastics and elastomers. The use of nanocellulose in these applications is intended to improve the performance of the resulting composites and the sustainable nature of materials going forward, since nanocellulose is derived from biomass and not from hydrocarbon materials. However, one problem with nanocellulose has been its dispersibility in hydrophobic, non-polar solvents and matrices (including plastics and elastomers), whether the nanocellulose is in a crystalline form or a fibril form, as normally the nanocellulose bonds to itself during drying, resulting in large agglomerates of nanocellulose in polymer composite structures.

For example, when nanocellulose is mixed in elastomeric compounds, good dispersion of the nanocellulose is desired, such that large agglomerates are eliminated and the full benefits of incorporating the nanocellulose into the elastomeric matrix are realized. Large agglomerates of any polymer additive can result in stress concentrators, which can result in premature failure of the polymer composite.

As such, it has become important to devise ways to greatly improve the dispersibility of the nanocellulose in polymer formulations, which remains a key issue facing the development, growth, and commercialization of nanocellulose in many end-use applications. Accordingly, it is to these ends that the present invention is generally directed.

SUMMARY

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

In accordance with the objectives of the invention, as embodied and broadly described herein, this disclosure, in one aspect, relates to a process for adding partitioning agents in or prior to the nanocellulose drying process, such that the partitioning agent remains intact and keeps nanocellulose crystals and nanocellulose fibrils from bonding to one another. The result is a nanocellulose dispersion composition that can easily be dispersed in polymer formulations, such as in elastomers and plastics.

Therefore, in one aspect of this invention, a process for partitioning a nanocellulose in an aqueous system for improved dispersibility in polymers is disclosed, and in this aspect, the process can comprise (a) combining an aqueous dispersion of the nanocellulose with a partitioning agent to form a mixture, and (b) drying the mixture to form a nanocellulose dispersion composition (NDC). The partitioning agent can comprise a carbon black filler, an elastomer latex, a wax, or any combination thereof.

In another aspect, a process for partitioning a nanocellulose in an aqueous system with a partitioning agent is disclosed, and in this aspect, the process can comprise (A) combining an aqueous dispersion of the nanocellulose with the partitioning agent to form a mixture, and (B) drying the mixture to form a nanocellulose dispersion composition (NDC). The partitioning agent can be stable in the NDC and can be spaced between nanocellulose particles to reduce or prevent agglomeration of the nanocellulose particles in the NDC. The partitioning agent can comprise a carbon black filler, an elastomer latex, a wax, or any combination thereof.

A nanocellulose dispersion composition also is provided, such as may be produced by any of the processes disclosed herein. The nanocellulose dispersion composition (NDC) can comprise (i) a partitioning agent comprising a carbon black filler, an elastomer latex, a wax, or any combination thereof, and (ii) a nanocellulose. Aspects of this invention also are directed to polymer compositions, and such compositions can comprise (I) a polymer and (II) any of the nanocellulose dispersion compositions disclosed herein.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

BRIEF DESCRIPTION OF THE FIGURES

The accompanying figures, which are incorporated in and constitute a part of this specification, illustrate several aspects and together with the description serve to explain certain principles of the invention.

Figure 1A:
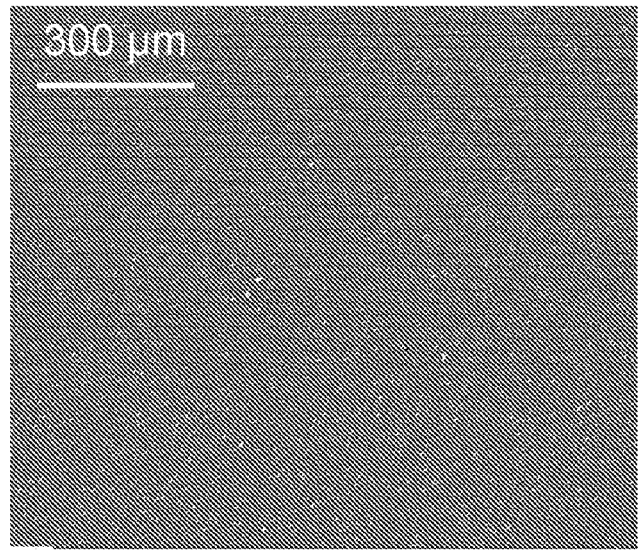
FIGS. 1A and 1B are backscattered and secondary scanning electron microscope (SEM) images, respectively, of a model passenger tire tread compound mixed using a reference carbon black grade, N234. The scale for FIGS. 1A and 1B is the same (scale bar=300 μm).

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, illustrative and representative methods and materials are now described.

All publications mentioned herein are incorporated herein by reference to disclose and describe the methods and/or materials in connection with which the publications are cited.

Unless defined otherwise, all technical and scientific terms used herein have the same meaning as commonly understood by one of ordinary skill in the art to which this invention belongs.

Test methods utilized herein are known and understood by those of skill in the art. References are provided for specific test methods, where appropriate. For example, interferometric microscope analysis (IFM) was performed using ASTM D2663, Standard Test Methods for Carbon Black—Dispersion in Rubber, Method D.

As used herein, unless specifically stated to the contrary, the singular forms "a," "an" and "the" include plural alternatives. Thus, for example, reference to "a polymer" or "a partitioning agent" includes mixtures or combinations of two or more polymers or partitioning agents, respectively, unless stated otherwise.

While compositions and methods are described herein in terms of "comprising" various components or steps, the compositions and methods also can "consist essentially of" or "consist of" the various components or steps, unless stated otherwise. For example, a nanocellulose dispersion composition (NDC) consistent with aspects of the present invention can comprise; alternatively, can consist essentially of; or alternatively, can consist of (i) a partitioning agent and (ii) a nanocellulose.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 also are disclosed.

As used herein, the terms "optional" and "optionally" mean that the subsequently described event or circumstance can or cannot occur, and that the description includes instances where said event or circumstance occurs and instances where it does not.

Disclosed are the components to be used in methods to prepare the compositions of the invention as well as the compositions themselves. These and other materials are disclosed herein, and it is understood that when combinations, subsets, interactions, groups, etc., of these materials are disclosed, that while specific reference of each various individual and collective combinations and permutations of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible, unless specifically indicated to the contrary. Thus, if a class of molecules A, B, and C are disclosed as well as a class of molecules D, E, and F and an example of a combination molecule, A-D is disclosed, then even if each is not individually recited, each is individually and collectively contemplated, meaning combinations A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed, it is understood that each of these additional steps can be performed with any specific aspect or combination of aspects of the methods of the invention.

As briefly described above, the present disclosure provides a process for partitioning of the nanocellulose as it exists in an individual fibril or crystalline state in an aqueous system, with a partitioning agent remaining stable and spaced between the nanocellulose particles upon drying to prevent bonding between—and agglomeration of—the individual nanocellulose fibrils and/or crystals. In one aspect, the disclosure provides a process for partitioning the nanocellulose, and in another aspect, the disclosure provides a nanocellulose composition that is compatible with various polymers and elastomeric compounds to improve nanocellulose dispersion in these polymers and elastomeric compounds, so that the full benefit of nanocellulose addition can be realized. For example, benefits of improved nanocellulose dispersion in elastomeric materials can include, but are not limited to, lower hysteresis or heat buildup, lower compound weight and other performance characteristics of tire compounds, for both tread and non-tread compounds, that may be important in the overall performance of a tire.

It should be noted that the nanocellulose of the present disclosure can comprise any nanocellulose, whether in crystalline or fibril form, and whether it is already treated or modified in some other manner. The source of the nanocellulose can be any suitable source, whether made from wood pulp or other biomass materials, and as made by any industrial process. Biomass fibers are made up of cellulose structural building blocks that can be extracted industrially in a variety of shapes and sizes including cellulose nanocrystals (NC) and cellulose nanofibrils (NF). Additionally, the particular size and shape of the nanocellulose can range from nano-scale up to micron-scale, whether in width and/or length. NF typically have dimensions of 5-20 nm in width and 500-2000 nm in length and contain both amorphous and crystalline domains of cellulose. NC typically have a width of 5-8 nm and a length of 100-300 nm and are predominantly crystalline. While these ranges and dimensions are typical, this invention encompasses all NC and NF materials, regardless of particle shapes or particle sizes/dimensions.

For practically all non-aqueous applications in which nanocellulose is used, improving its dispersion and thus the utility and benefit to these applications has been a major hurdle for implementation of this technology. Thus, it has become important to improve the dispersion and find economical and practical methods and processes that make the nanocellulose highly dispersible in polymers, such as elastomeric compounds. Use of partitioning agents in or before the nanocellulose drying process itself, instead of post-processing techniques, can help achieve this goal.

In terms of improving the nanocellulose dispersion, various chemical surface modification approaches have been tried post-drying, and while some may have ultimately been successful, these usually require extreme measures that would prove difficult to scale-up to commercial quantities, and are uneconomical. Generally, these methods are based on lyophilization (freeze drying) of nanocellulose, which is the established, laboratory method for preventing irreversible inter-particle bonding of nanocellulose. Freeze-drying is not economical nor scaleable for commercial production of nanocellulose.

Therefore, a simpler and more economical process is desirable. As such, a method of partitioning the nanocellulose to prevent inter-nanocellulose bonding prior to or during drying is provided, resulting in improved nanocellulose dispersion in polymers such as plastics and elastomers.

Nanocellulose Dispersion Compositions

Nanocellulose can be produced by, for example, breaking down biomass to sub-micron cellulose nanofibrils or nanocrystals using chemical means, mechanical means, or a combination of chemical and mechanical means. Other methods for providing nanocellulose, such as, for example, bacterial nanocellulose and tunicate-nanocellulose, are also available. Typically, the production of nanocellulose occurs in two primary stages. The first stage is a purification of the biomass to remove most of the non-cellulose components in the biomass such as lignin, hemicelluloses, extractives, and inorganic contaminants. This is typically done by conventional pulping and bleaching. For production of cellulose nanofibrils, the second stage typically entails mechanical refining of the purified biomass fibers. For cellulose nanocrystals, the second stage typically entails acid hydrolysis of the purified fibers, followed by high shear mechanical treatment. Novel production processes such as the versatile AVAP® process can produce either cellulose nanocrystals or cellulose nanofibrils through chemical fractionation of biomass using $SO_2$ and ethanol (of varying severity), followed by mechanical treatment. Regardless of nanocellulose variety, after the final mechanical treatment stage, the nanocellulose is often suspended in an aqueous solution as a stable gel above a threshold concentration (typically greater than 2 wt. % solids). Upon drying and removal of the water, the nanocellulose particles ordinarily will irreversibly bond and agglomerate, thus resulting in poor dispersion in polymer systems.

To reduce or prevent the nanocellulose from bonding to itself during drying, as described herein, a partitioning agent can be added to the aqueous nanocellulose dispersion, which will interact sufficiently with the surface of the nanocellulose and/or distribute uniformly between the nanocellulose particles to reduce or prevent nanocellulose agglomeration.

A first process for partitioning a nanocellulose in an aqueous system for improved dispersibility in polymers can comprise (a) combining an aqueous dispersion of the nanocellulose with a partitioning agent to form a mixture, and (b) drying the mixture to form a nanocellulose dispersion composition (NDC). A second process for partitioning a nanocellulose in an aqueous system with a partitioning agent can comprise (A) combining an aqueous dispersion of the nanocellulose with the partitioning agent to form a mixture, and (B) drying the mixture to form a nanocellulose dispersion composition (NDC). The partitioning agent can be stable in the NDC and can be spaced between nanocellulose particles to reduce or prevent agglomeration of the nanocellulose particles in the NDC. Nanocellulose dispersion compositions produced by any of the processes disclosed herein also are encompassed by this invention. The nanocellulose dispersion composition (NDC) can contain, at a minimum, the partitioning agent and the nanocellulose—and the partitioning agent can comprise a carbon black filler, an elastomer latex, or a wax, as well as any combination of these materials.

In step (a) and step (A) of the first and second processes, an aqueous dispersion of the nanocellulose can be combined with the partitioning agent to form a mixture. The aqueous dispersion of the nanocellulose can contain any suitable amount of the nanocellulose, but generally is at least about 2 wt. % solids and up to 10 wt. % solids (e.g., from about 2 wt. % to about 5 wt. % solids).

Any suitable vessel and conditions can be used for combining the aqueous nanocellulose dispersion with the partitioning agent, and such can be accomplished batchwise or continuously. As an example, the nanocellulose dispersion and the partitioning agent can be combined in a suitable vessel (e.g., a tank) under atmospheric pressure, optionally with agitation or mixing, and at any suitable temperature, often ranging from about 15° C. to about 60° C.

The amount of the partitioning agent used in relation to the nanocellulose is not particularly limited, but the weight ratio of the partitioning agent to the nanocellulose in the nanocellulose dispersion composition often ranges from about 0.25:1 to about 25:1. In some aspects, the weight ratio of the partitioning agent to the nanocellulose can fall within a range from about 0.25:1 to about 25:1, from about 0.25:1 to about 15:1, from about 0.3:1 to about 10:1, from about 0.5:1 to about 25:1, from about 0.7:1 to about 15:1, from about 0.75:1 to about 15:1, from about 1:1 to about 10:1, from about 1.2:1 to about 12:1, from about 1.8:1 to about 8:1, from about 1.5:1 to about 10:1, from about 4:1 to about 15:1, or about 0.25:1, 0.4:1, 0.6:1, 0.8:1, 1:1, 1.2:1, 1.4:1, 1.6:1, 1.8:1, 2:1, 2.5:1, 3:1, 3.5:1, 4:1, 4.5:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, or 25:1. If more than one partitioning agent is used, the total amount of partitioning agents is used to determine the weight ratio.

In the aqueous nanocellulose dispersion or the nanocellulose dispersion composition (NDC), the type of nanocellulose also is not particularly limited. In one aspect, for instance, the nanocellulose can comprise nanocellulose crystals (NC), nanocellulose fibrils (NF), or a combination thereof. The nanocellulose may further contain lignin, as surface lignin and/or as lignin contained in the bulk particles. In another aspect, the nanocellulose can comprise lignin-coated nanocellulose crystals (LCNC), lignin-coated nanocellulose fibrils (LCNF), or a combination thereof. Generally, these lignin-coated materials are more hydrophobic. In yet another aspect, the nanocellulose can comprise hydrophilic cellulose nanocellulose crystals (CNC), hydrophilic cellulose nanocellulose fibrils (CNF), or a combination thereof.

Typically, a suitable partitioning agent is compatible with a polymer (e.g., an elastomer, a tire formulation) and reduces nanocellulose agglomeration in the NDC, and reduces agglomeration in the polymer formulation. Often, the partitioning agent in the nanocellulose dispersion composition, or the partitioning agent used to form the nanocellulose dispersion composition, can contain a carbon black filler, an elastomer latex, a wax, or any combination thereof. Any suitable rubber latex can be used, illustrative examples of which can include, but are not limited to, natural rubber (NR), isoprene rubber (IR), emulsion styrene-butadiene rubber (ESBR), and the like. Mixtures or combinations of two or more rubber latex materials can be used.

The wax component can include, but is not limited to, non-branched alkane paraffin waxes, microcrystalline waxes including branched paraffin waxes and ceresine waxes (either natural mineral, petroleum refined or lignin refined), polyethylene waxes, functionalized polyethylene waxes, and the like, or any combination thereof.

The carbon black of the present invention, when present, can comprise any carbon black suitable for use with the NDC and/or elastomeric materials employed. In one aspect, the carbon black can comprise (or consist essentially of, or consist of) a furnace carbon black. Additionally or alternatively, the carbon black can comprise (or consist essentially of, or consist of) a surface-modified furnace carbon black, such as an oxidized furnace carbon black. In other aspects, the carbon black can comprise a carbon black suitable for use in rubber, for example, in a tire. In another aspect, the carbon black can comprise a carbon black suitable for use in a tire tread or in a tire carcass. In various aspects, the carbon black can comprise an N900 series carbon black, an N800 series carbon black, an N700 series carbon black, an N600 series carbon black, an N500 series carbon black, an N400 series carbon black, an N300 series carbon black, an N200 series carbon black, an N100 series carbon black, or a mixture thereof. Various physical properties of exemplary carbon blacks that can be useful in the present invention are recited below. It should be understood that these values and ranges are intended to be exemplary in nature and that the invention is not limited to any particular range, value, or combination.

The carbon black can have a nitrogen surface area, as determined by, for example, ASTM Method D6556-14, of from about 8 $m^2/g$ to about 140 $m^2/g$; from about 20 $m^2/g$ to about 140 $m^2/g$; from about 45 $m^2/g$ to about 140 $m^2/g$; from about 60 $m^2/g$ to about 140 $m^2/g$; from about 90 $m^2/g$ to about 140 $m^2/g$; from about 95 $m^2/g$ to about 135 $m^2/g$; from about 100 $m^2/g$ to about 130 $m^2/g$; from about 105 $m^2/g$ to about 125 $m^2/g$; from about 110 $m^2/g$ to about 125 $m^2/g$; from about 115 $m^2/g$ to about 125 $m^2/g$; from about 110 $m^2/g$ to about 120 $m^2/g$; from about 115 $m^2/g$ to about 120 $m^2/g$; from about 115 $m^2/g$ to about 121 $m^2/g$; or from about 116 $m^2/g$ to about 120 $m^2/g$. In another aspect, the carbon black can have a nitrogen surface area of about 90, 92, 94, 96, 98, 100, 102, 104, 106, 108, 110, 112, 114, 116, 118, 120, 122, 124, 126, 128, 130, 132, 134, 136, 138, or 140 $m^2/g$. In another aspect, the carbon black can have a nitrogen surface area of about 8, 10, 12, 14, 16, 18, 20, 22, 24, 26, 28, 30, 35, 40, 45, 50, 55, 60, 65, 70, 75, 80, 85, 90, 95, 100, 105, 110, 115, 120, 125, 130, 135, or 140 $m^2/g$. In yet another aspect, the carbon black can have a nitrogen surface area of about 118 $m^2/g$. In other aspects, the carbon black of the present invention can have a nitrogen surface area greater than or less than any value specifically recited herein, and the present invention is not intended to be limited to any particular nitrogen surface area value.

The carbon black can have an external surface area, based on the statistical thickness method (STSA, ASTM D6556-14), of from about 8 $m^2/g$ to about 125 $m^2/g$; from about 20 $m^2/g$ to about 125 $m^2/g$; from about 45 $m^2/g$ to about 125 $m^2/g$; from about 60 $m^2/g$ to about 125 $m^2/g$; from about 80 $m^2/g$ to about 125 $m^2/g$; from about 85 $m^2/g$ to about 120 $m^2/g$; from about 90 $m^2/g$ to about 115 $m^2/g$; from about 95 $m^2/g$ to about 110 $m^2/g$; from about 95 $m^2/g$ to about 105 $m^2/g$; from about 98 $m^2/g$ to about 104 $m^2/g$; or from about 99 $m^2/g$ to about 103 $m^2/g$. In another aspect, the carbon black can have an external surface area of about 101 $m^2/g$. In another aspect, the carbon black can have an external surface area, based on the statistical thickness method, of about 8, 10, 12, 14, 16, 18, 20, 22, 24, 26, 28, 30, 35, 40, 45, 50, 55, 60, 65, 70, 75, 80, 85, 90, 95, 100, 105, 110, 115, 120, or 125 $m^2/g$. In various aspects, the external surface area of a carbon black is the specific surface area that is accessible to a rubber compound. In other aspects, the carbon black of the present invention can have an external surface area greater than or less than any value specifically recited herein, and the present invention is not intended to be limited to any particular external surface area value.

The carbon black of the present invention can have a pH, as measured by, for example, ASTM Method D1512-15 using either Test Method A or Test Method B, of from about 2.5 to about 4; from about 2.8 to about 3.6; or from about 3 to about 3.4. In another aspect, the carbon black of the present invention can have a pH of about 3.2. In other aspects, the carbon black of the present invention can have a pH greater than or less than any value specifically recited herein, and the present invention is not intended to be limited to any particular pH value.

The carbon black of the present invention can have a void volume, as determined by, for example, ASTM Method D6086-09a, of from about 55 cm$^3$/100 g to about 67 cm$^3$/100 g (50 GM); from about 60 cm$^3$/100 g to about 65 cm$^3$/100 g (50 GM); from about 25 cm$^3$/100 g to about 60 cm$^3$/100 g; from about 30 cm$^3$/100 g to 60 cm$^3$/100 g; from about 35 cm$^3$/100 g to 60 cm$^3$/100 g; from about 40 cm$^3$/100 g to 60 cm$^3$/100 g; from about 45 cm$^3$/100 g to 60 cm$^3$/100 g; from about 50 cm$^3$/100 g to about 60 cm$^3$/100 g (75 GM); from about 53 cm$^3$/100 g to about 58 cm$^3$/100 g (75 GM); from about 45 cm$^3$/100 g to about 55 cm$^3$/100 g (100 GM); or from about 47 cm$^3$/100 g to about 53 cm$^3$/100 g (100 GM). In another aspect, the carbon black can have a 50 GM void volume of about 62.2 cm$^3$/100 g; a 75 GM void volume of about 55.3 cm$^3$/100 g; and/or a 100 GM void volume of about 50.4 cm$^3$/100 g. In other aspects, the void volume of a carbon black can be greater than or less than any value specifically recited herein, and the present invention is not intended to be limited to any particular void volume.

The carbon black of the present invention can have a moisture content, as measured by, for example, ASTM Method D1509-15, of from about 2.5 wt. % to about 4.5 wt. %; from about 3 wt. % to about 4 wt. %; or from about 3.2 wt. % to about 3.8 wt. %. In another aspect, the carbon black of the present invention can have a moisture content of about 3.5 wt. %. It should be understood that the moisture content of carbon black materials can change, depending upon, for example, environmental and/or storage conditions, and as such, the particular moisture content of a given sample of carbon black can vary. In other aspects, the carbon black of the present invention can have a moisture content greater than or less than any value specifically recited herein, and the present invention is not intended to be limited to any particular moisture content value.

In one aspect, the carbon black of the present invention is an oxidized carbon black, such as an oxidized furnace carbon black. Various methods exist to oxidize carbon blacks, such as, for example, ozonation, and the particular method for oxidizing a carbon black can vary, provided that a plurality of desired oxygen-containing functional groups are present on the surface of the carbon black. Typical oxygen-containing functional groups that can be present on the surface of an oxidized carbon black can include, for example, carboxyl, hydroxyl, phenols, lactones, aldehydes, ketones, quinones, and hydroquinones groups. In various aspects, the amount and type of functional groups present on the surface of an oxidized carbon black can vary depending on the intensity and type of oxidation treatment. In one aspect, the carbon black has been oxidized by treatment with ozone.

The carbon black of the present invention can have a volatile content of from about 0.5 wt. % to about 6.5 wt. %; from about 1 wt. % to about 6.5 wt. %; from about 1.5 wt. % to about 6.5 wt. %; from about 2 wt. % to about 6.5 wt. %; from about 2.5 wt. % to about 6.5 wt. %; from about 3 wt. % to about 6.5 wt. %; from about 3.5 wt. % to about 6.5 wt. %; from about 4 wt. % to about 6.5 wt. %; from about 4.5 wt. % to about 6.5 wt. %; from about 5 wt. % to about 6 wt. %; or from about 5.2 wt. % to about 5.8 wt. %. In another aspect, the carbon black of the present invention can have a volatile content of at least about 4.5 wt. %, at least about 5 wt. %, at least about 5.5 wt. %, or higher. In another aspect, the carbon black of the present invention can have a volatile content of about 5.5 wt. %. In still other aspects, the volatile content of a carbon black can be greater than or less than any value specifically recited herein, and the present invention is not intended to be limited to any particular volatile content value.

The carbon black of the present invention can have an oxygen content of from about 0.25 wt. % to about 5.5 wt. %; from about 0.5 wt. % to about 5.5 wt. %; from about 1 wt. % to about 5.5 wt. %; from about 1.5 wt. % to about 5.5 wt. %; from about 2 wt. % to about 5.5 wt. %; from about 2.5 wt. % to about 5.5 wt. %; from about 3 wt. % to about 5 wt. %; from about 3.5 wt. % to about 4.5 wt. %; or from about 3.7 wt. % to about 4.3 wt. %. In another aspect, the carbon black of the present invention can have an oxygen content of at least about 3.5 wt. %, at least about 4 wt. %, or higher. In another aspect, the carbon black of the present invention can have an oxygen content of about 4 wt. %. In still other aspects, the oxygen content of a carbon black can be greater than or less than any value specifically recited herein, and the present invention is not intended to be limited to any particular oxygen content value.

Optionally, a hydrocarbon oil can be used along with the partitioning agent(s). For example, in step (a) or step (A), the aqueous dispersion of the nanocellulose can be combined with the partitioning agent(s) and a hydrocarbon oil to form the mixture. The hydrocarbon oil can comprise an aliphatic hydrocarbon in one aspect, while in another aspect, the hydrocarbon oil can comprise an aromatic hydrocarbon. Yet, in another aspect, the hydrocarbon oil can comprise a mixture or combination of an aliphatic hydrocarbon and an aromatic hydrocarbon. Any suitable aliphatic and/or aromatic hydrocarbons can be used, however, it is beneficial that the hydrocarbons be in the liquid phase at the conditions under which the aqueous nanocellulose dispersion and the partitioning agent are combined. An illustrative and non-limiting example of a suitable hydrocarbon oil that can be used as a partitioning agent is a treated distillate aromatic extract (TDAE) oil.

Optionally, the aqueous nanocellulose dispersion, partitioning agents, and optional hydrocarbon oil can be mixed under high-shear to ensure uniform distribution of the individual components. High-shear mixing techniques include, but are not limited to, homogenization, sigma blade mixing, rotor-stator mixing, and static in-line mixing.

In step (b) and step (B) of the first and second processes, the mixture can be dried to form the nanocellulose dispersion composition (NDC). Any suitable equipment and drying technique can be used. In an aspect, the aqueous mixture can be exposed to a suitable drying step to remove the water. Drying techniques can include, but are not limited to, evaporation, spray drying, freeze drying, spin-flash drying, high-shear mixing, drying, and drum drying. The resultant nanocellulose dispersion composition—containing the partitioning agent and the nanocellulose—generally contains less than 1.5 wt. % water/moisture.

During a drying step and in a dried state, one or more coupling chemicals can optionally be introduced into the NDC composition to, for example, modify the surface of the nanocellulose and enable subsequent coupling of the cellulosic surface to the rubber matrix during the vulcanization of a rubber compound prepared using the NDC. Coupling agents are well known to those skilled in the art and can, in various aspects, include mono and/or bi-functional silanes based on mercapto, alkoxy, vinyl, amino, and methacryloxy chemistry, including, for example, common bi-functional sulfur-containing coupling silanes such as 3,3'-bis-(triethoxysilylpropyl)-tetrasulfide.

Beneficially, the nanocellulose dispersion composition (NDC), which can comprise (i) the partitioning agent and (ii) the nanocellulose, has superior nanocellulose dispersibility in a polymer formulation to that of the nanocellulose without the partitioning agent, typically by more than 25%, or by more than 50%, as measured by interferometric microscopy (IFM). For instance, if the amount of undispersed material (based on area) via IFM was 12% for nanocellulose without a partitioning agent, then a 25% improvement would be an area fraction of undispersed material of 9%, and a 50% improvement would be an area fraction of undispersed material of 6%

Polymer Compositions

This invention, in some variations, is also directed to, and encompasses, any compositions, formulations, and articles of manufacture that contain any of the nanocellulose dispersion compositions disclosed herein (and their respective characteristics or features, such as the relative amounts of partitioning agent and nanocellulose, the type of partitioning agent, and the type of nanocellulose, among others). In a particular aspect of this invention, a polymer composition is disclosed, and in this aspect, the polymer composition can comprise any suitable polymer (one or more than one) and any of the nanocellulose dispersion compositions disclosed herein.

The amount of the nanocellulose dispersion composition used in the polymer composition is not particularly limited, but the weight ratio of the polymer to the nanocellulose dispersion composition (polymer:NDC) often ranges from about 100:1 to about 1:1, from 80:1, to about 10:1, from about 75:1 to about 2:1, from about 60:1 to about 5:1, from about 50:1 to about 1:1, from about 40:1 to about 4:1, from about 75:1 to about 25:1, from about 90:1 to about 15:1, or about 100:1, 98:1, 96:1, 94:1, 92:1, 90:1, 85:1, 80:1, 75:1, 70:1, 65:1, 60:1, 55:1, 50:1, 45:1, 40:1, 35:1, 30:1, 25:1, 20:1, 15:1, 10:1, 8:1, 6:1, 4:1, 2:1, or 1:1. In some aspects, the weight ratio of polymer:NDC can fall within a range from about 75:1 to about 1.5:1, or from about 50:1 to about 2:1.

In one aspect, the polymer in the polymer composition can comprise a thermoplastic polymer, while in another aspect, the polymer can comprise a thermoset polymer. In another aspect, the polymer can comprise, either singly or in any combination, an epoxy, an acrylic, an ester, a urethane, a silicone, and/or a phenolic. In yet another aspect, the polymer can comprise, either singly or in any combination, a polyethylene (e.g., an ethylene homopolymer or ethylene-based copolymer), a polypropylene, a polybutylene terephthalate, an acrylonitrile butadiene styrene (ABS), a polyamide, a polyimide, a polystyrene, a polycarbonate, an ethylene-vinyl acetate (EVA) copolymer, and/or a polyolefin-styrene (e.g., ethylene-styrene).

In another aspect, the polymer used in the formulation/composition can comprise any suitable rubber or elastomer, either singly or in any combination, and non-limiting examples can include a natural rubber (NR), an epoxidized natural rubber (ENR), a synthetic cis-polyisoprene (IR), an emulsion styrene butadiene rubber (eSBR), a solution styrene butadiene rubber (sSBR), a polybutadiene rubber (BR), a butyl rubber (IIR/CIIR/BIIR), a chloroprene rubber (CR), a nitrile elastomer (NBR), a hydrogenated nitrile elastomer (HNBR), a carboxylated nitrile elastomer (XNBR), an ethylene propylene rubber (EPM/EPDM), a fluoroelastomer (FPM/FKM), a polyurethane rubber (AU/EU/PU), and the like, as well as any combination thereof.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Further, these examples in no way should limit the scope or range of available partitioning agents or available nanocellulose materials that may be used for preparing nanocellulose dispersion compositions for use in polymer formulations, and are only described as examples for the purpose of demonstrating the concept of combining the partitioning agent and the nanocellulose into a highly dispersible NDC.

The nanocellulose crystals or nanocellulose fibrils in these examples were produced using the AVAP® process described above and a proprietary method that deposits lignin onto the surface of the fibrils or crystals to make them more hydrophobic and more compatible with polymers and elastomers.

Figure 1B:
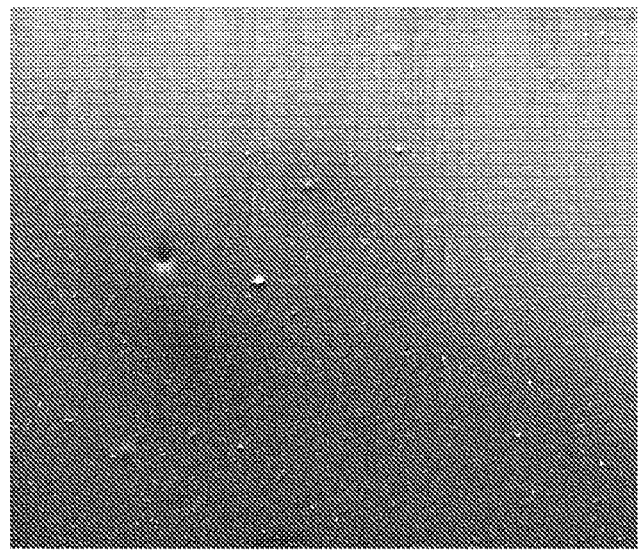

In Example 1, a model passenger tire tread compound was mixed using a reference carbon black grade, N234. This compound is included as a reference to demonstrate typical carbon black dispersion levels. N234 comprised 100% of the filler in this compound, which is equivalent to 75 phr in the compound formulation. Detailed descriptions of representative compound formulations (values in phr) as well as a standard mixing procedure are summarized in Tables 1-2. As shown in the SEM images in FIGS. 1 A & B, the N234 carbon black had excellent dispersibility. FIG. 1A is a backscattered electron image of a razor cut compound surface and FIG. 1B is a secondary electron image of the same region. Dispersion as quantified by interferometric microcopy (IFM) was generally in the range of 98 to 100% dispersion, with an area fraction of undispersed carbon black of 0.8%.

Figure 2A:
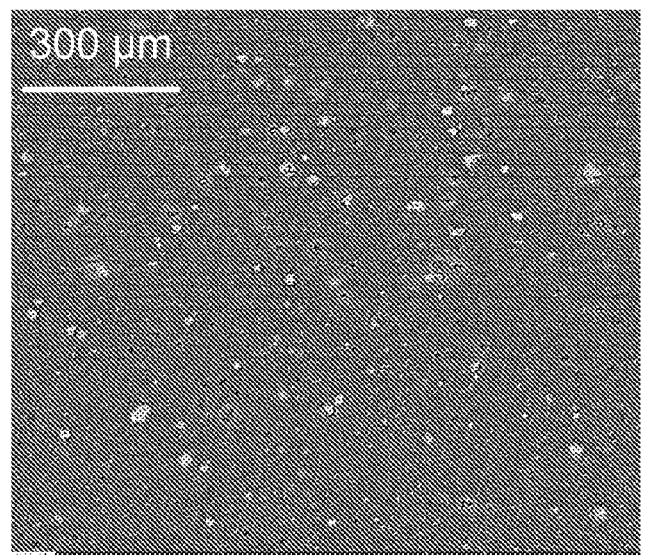
FIGS. 2A and 2B are backscattered and secondary SEM images, respectively, of the compound dispersion of Example 2, wherein a portion of the carbon black was replaced with dried lignin-coated nanocellulose fibrils (LCNF), in accordance with various aspects of the present disclosure. The scale for FIGS. 2A and 2B is the same (scale bar=300 μm).
Figure 2B:
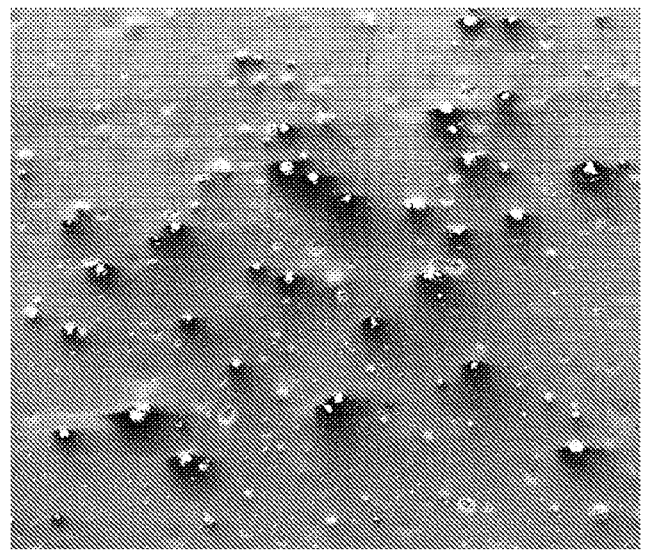

Example 2 was produced using the same mixing procedure as Example 1; however, a small fraction (6.7 wt. %) of N234 was replaced with dried lignin-coated nanocellulose fibrils (LCNF). LCNF comprised 6.7 wt. % of the total filler loading, which is equivalent to 5 phr in the compound formulation. The remaining filler loading was comprised of N234 (93.3 wt. %), which is equivalent to 70 phr in the compound formulation. FIGS. 2 A & B demonstrates that the dispersion of the nanocellulose was very poor, as evidenced by large agglomerates of nanocellulose fibrils throughout the compound cross-section by backscattered (FIG. 2A) and secondary (FIG. 2B) SEM imaging. The area fraction of undispersed material was 9.11%, as quantified by interferometric microscopy (IFM).

Example 3 was produced using the same procedure as Example 2. Instead of adding dried, stand-alone LCNF as in Example 2, Example 3 used an NDC, which contained LCNF treated with surface modified carbon black (SMCB, N234) as a partitioning agent, as well as TDAE oil and natural rubber latex. The weight ratio of the LCNF to SMCB to TDAE oil to NR latex was 1:1:1:1. The NDC was prepared by mixing an aqueous dispersion of the nanocellulose with the SMCB, TDAE oil and NR latex followed by high shear homogenization and drying to less than 1.5 wt. % water. The total loading of NDC was 20 phr, such that the LCNF added to the final compound was 6.7 wt. % of the total filler loading, which is equivalent to 5 phr in the compound formulation.

Figure 3A:
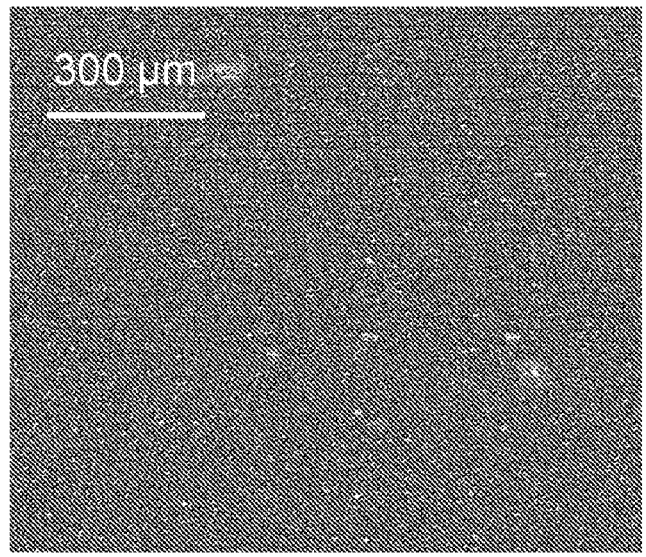
FIGS. 3A and 3B are backscattered and secondary SEM images, respectively, of the compound dispersion of Example 3, wherein a portion of the carbon black was replaced with LCNF as part of a nanocellulose dispersion composition (NDC) containing LCNF, surface-modified carbon black (SMCB), and TDAE oil, in accordance with various aspects of the present disclosure. The scale for FIGS. 3A and 3B is the same (scale bar=300 µm).
Figure 3B:
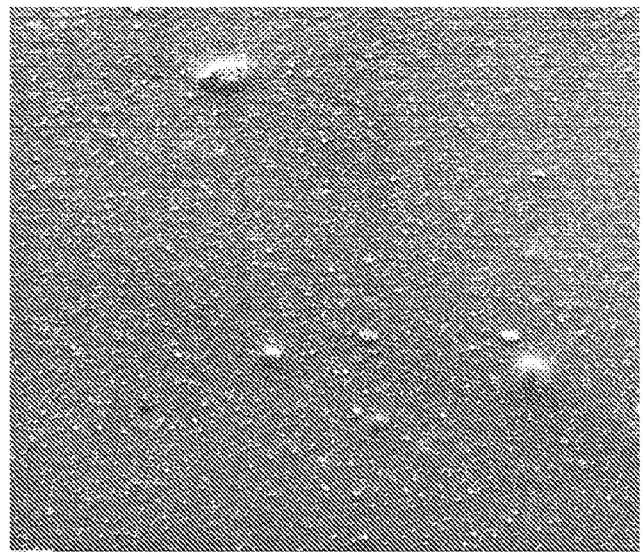

FIGS. 3 A & B shows the nanocellulose dispersion achieved when adding the LCNF/SMCB/TDAE/NR NDC to the rubber compound mixer. FIG. 3A is a backscattered electron image of a razor cut compound surface and FIG. 3B is a secondary electron image of the same region. The area fraction of undispersed material was 2.78% (as quantified by IFM), and is a significant improvement over Example 2 (FIGS. 2A and 2B), with fewer and smaller nanocellulose agglomerates present in the cross-section. The dispersibility is more similar to that of the N234 carbon black in Example 1 (FIGS. 1A and 1B), with a few undispersed regions.

Figure 4A:
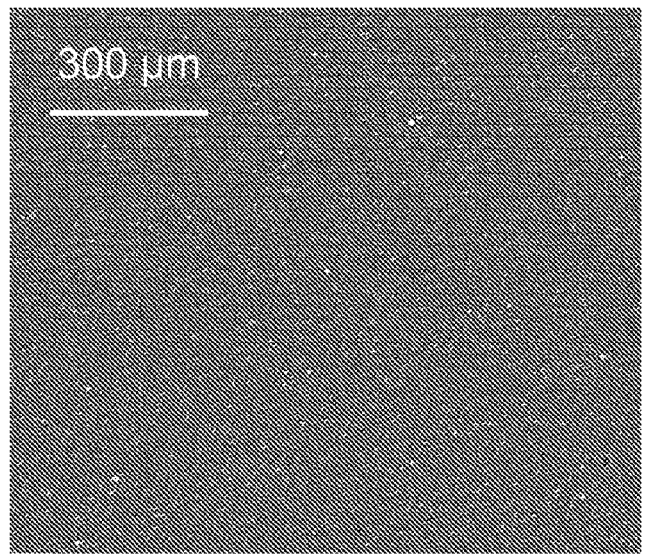
FIGS. 4A and 4B are backscattered and secondary SEM images, respectively, of the model truck tire tread compound dispersion of Example 4, in accordance with various aspects of the present disclosure. The scale for FIGS. 4A and 4B is the same (scale bar=300 µm).
Figure 4B:
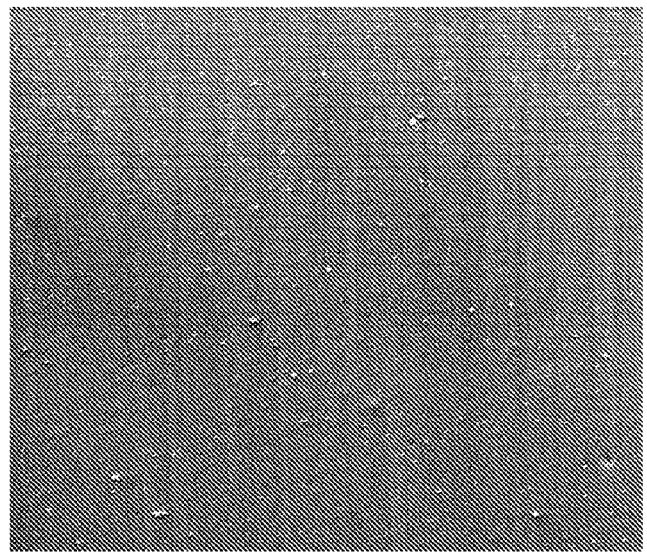

In Example 4, a model truck tire tread compound was mixed using a reference carbon black grade, N234. This compound is included as a reference to demonstrate typical carbon black dispersion levels. N234 comprised 100% of the filler in this compound, which is equivalent to 50 phr in the compound formulation. Detailed descriptions of representative compound formulations (values in phr) as well as a standard mixing procedure are summarized in Tables 1 and 3. As shown in FIGS. 4 A & B, the N234 carbon black had excellent dispersibility. FIG. 4A is a backscattered electron image of a razor cut compound surface and FIG. 4B is a secondary electron image of the same region. Dispersion as quantified by interferometric microcopy (IFM) was generally in the range of 98 to 100% dispersion, with an area fraction of undispersed carbon black of 0.15%.

Example 5 was produced using the same mixing procedure as Example 4; however, a small fraction (10 wt. %) of N234 was replaced with dried lignin-coated nanocellulose fibrils (LCNF). LCNF comprised 10 wt. % of the total filler loading, which is equivalent to 5 phr in the compound formulation. The remaining filler loading was comprised of N234 (90 wt. %), which is equivalent to 45 phr in the compound formulation. FIGS. 5 A & B demonstrates that the dispersion of the nanocellulose was very poor by backscattered (FIG. 2A) and secondary (FIG. 2B) SEM imaging, as evidenced by large agglomerates of nanocellulose fibrils throughout the compound cross-section. The area fraction of undispersed material was 11.52%, as quantified by interferometric microscopy (IFM).

Figure 5A:
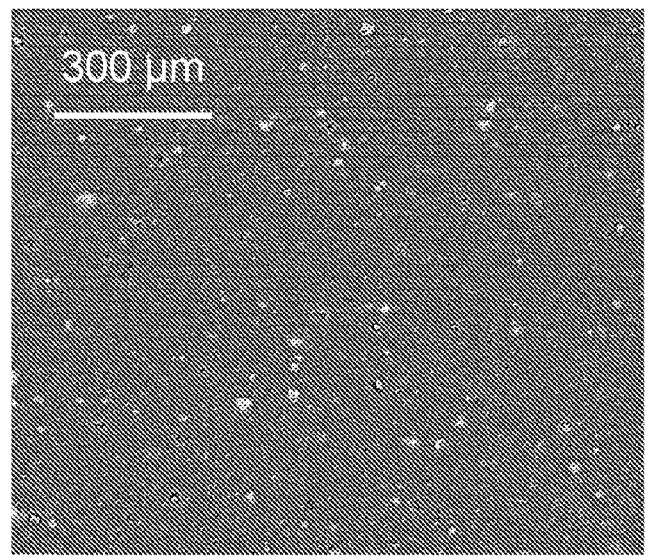
FIGS. 5A and 5B are backscattered and secondary SEM images, respectively, of the compound dispersion of Example 5, wherein a portion of the carbon black was replaced with dried LCNF, in accordance with various aspects of the present disclosure. The scale for FIGS. 5A and 5B is the same (scale bar=300 µm).
Figure 5B:
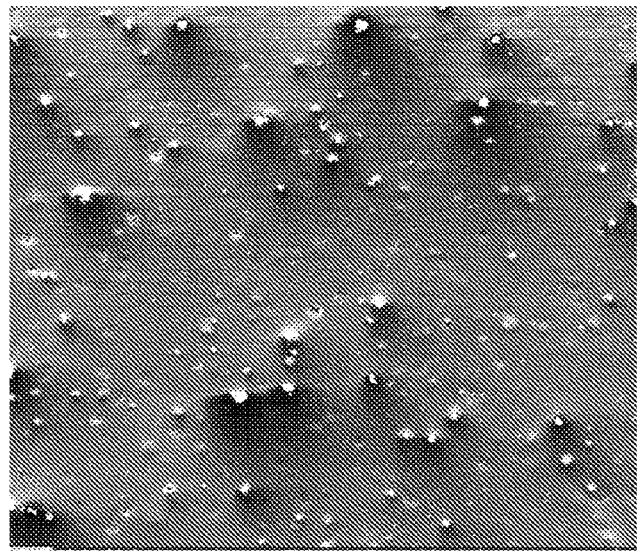
Figure 6A:
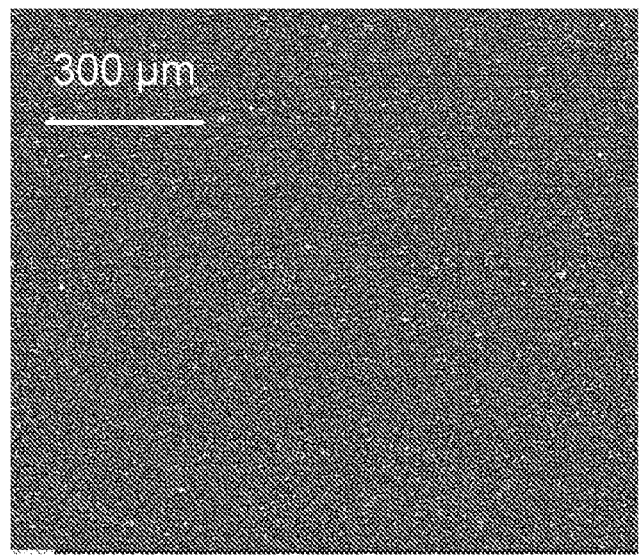
FIGS. 6A and 6B are backscattered and secondary SEM images, respectively, of the compound dispersion of Example 6, wherein a portion of the carbon black was replaced with LCNF as part of a NDC containing LCNF and natural rubber latex, in accordance with various aspects of the present disclosure. The scale for FIGS. 6A and 6B is the same (scale bar=300 µm).
Figure 6B:
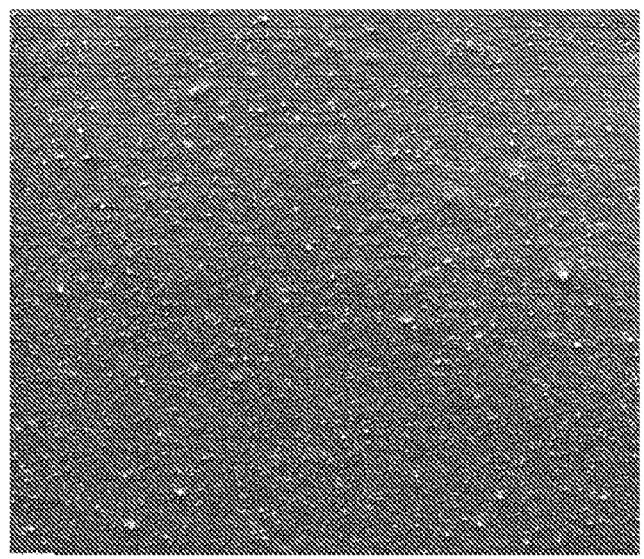

Example 6 was produced using the same mixing procedure as Example 1. Instead of adding dried, stand-alone LCNF as in Example 5, Example 6 used an identical NDC to Example 3. In this particular example, NR latex was used in the NDC, because this is a common material in truck tread recipes; however, other latex elastomer materials can be used. The weight ratio of the LCNF to SMCB to TDAE oil to NR was 1:1:1:1. The NDC was prepared in a manner similar to that of Example 3. The total loading of NDC was 20 phr, such that the LCNF added to the final compound was 10 wt. % of the total filler loading, which is equivalent to 5 phr in the compound formulation FIGS. 6 A & B shows the nanocellulose dispersion achieved when adding the LCNF/SMCB/TDAE/NR NDC to the rubber compound. FIG. 3A is a backscattered electron image of a razor cut compound surface and FIG. 3B is a secondary electron image of the same region. The area fraction of undispersed material was 2.44% as quantified by IFM, and is a significant improvement over Example 5 (FIGS. 5A and 5B). Note that the few undispersed regions in the SEM cross-section are significantly smaller than those in FIGS. 5A/5B. The measured dispersion level of nanocellulose in this compound is similar to that of Example 4.

TABLE 1

| Component | Passenger Tire Example 1 | Passenger Tire Example 2 | Passenger Tire Example 3 | Truck Tire Example 4 | Truck Tire Example 5 | Truck Tire Example 6 |
|---|---|---|---|---|---|---|
| SBR | 96.25 | 96.25 | 89.38 | — | — | — |
| NR | — | — | 5 | 80 | 80 | 80 |
| BR | 30 | 30 | 30 | 20 | 20 | 20 |
| Carbon Black | 75 | 70 | 70 | 50 | 45 | 45 |
| LCNF | — | 5 | 5 | 0 | 5 | 5 |
| TDAE Oil | 5.75 | 5.75 | 7.63 | 4 | 4 | 4 |
| ZnO | 4 | 4 | 4 | 4 | 4 | 4 |
| Stearic Acid | 2 | 2 | 2 | 2 | 2 | 2 |
| Wax | 2.5 | 2.5 | 2.5 | 3 | 3 | 3 |
| 6PPD | 2 | 2 | 2 | 2 | 2 | 2 |
| TMQ | 2 | 2 | 2 | 1 | 1 | 1 |
| Sulfur | 1.9 | 1.9 | 1.9 | 1.8 | 1.8 | 1.8 |
| TBBS | 1.5 | 1.5 | 1.5 | 2.4 | 2.4 | 2.4 |

TABLE 2

Mixing Protocol (Passenger Car Tread)

| Pass | Time (sec) | Temp (° C.) | RPM | Process |
|---|---|---|---|---|
| 1 | — | 40 | 77 | Load: Polymer, NDC |
| 1 | 30 | 40 | 77 | Ram Down Mixing |
| 1 | — | 40 | 77 | Load: 2/3 CBSweep |
| 1 | 60 | 40 | 77 | Ram Down Mixing |
| 1 | — | 40 | 77 | Load: Oil, 1/3 CB (blended) |
| 1 | 90 | 40 | Varies | Ram Down Mixing - Reactive Feedback to 120° C. |
| 1 | — | 40 | 77 | Load Chemicals, Sweep |
| 1 | 15 | 40 | 77 | Ram Up Mixing |
| 1 | 30 | 40 | Varies | Ram Down Mixing - Reactive Feedback to 150° C. |
| 1 | 180 | 40 | Varies | Ram Down Mixing - Reactive Feedback to 160° C. - Hold at 160° C. for 3 minutes |
| 1 | ~400 | — | 77 | Discharge |
| Mill: 70° C., 25:21 rpm, Gap 0.055-60" | | | | |
| 2 | — | 40 | 77 | Load: Masterbatch |
| 2 | 30 | 40 | 77 | Ram Down Mixing |
| 2 | — | 40 | 77 | Sweep |
| 2 | 30 | 40 | Varies | Ram Down Mixing - Reactive Feedback to 150° C. |
| 2 | 180 | 40 | Varies | Ram Down Mixing - Reactive Feedback to 160° C. - Hold at 160° C. for 3 minutes |
| 2 | ~240 | — | 77 | Discharge |
| Mill: 70° C., 25:21 rpm, Gap 0.055-60" | | | | |
| 2 | — | 25 | 60 | Load: 1/2 MB, Curatives, 1/2 MB |
| 2 | 30 | 25 | 60 | Ram Down Mixing |
| 2 | 30 | 25 | 45 | Ram Down Mixing |
| 2 | — | 25 | 45 | Sweep |
| 2 | 120 | 25 | 45 | Ram Down Mixing |
| 2 | ~180 | — | 45 | Discharge (100° C. Max) |
| Mill: 70° C., 25:21 rpm, Gap 0.055-60" | | | | |

TABLE 3

Mixing Protocol (Truck Tread)

| Pass | Time (sec) | Temp (° C.) | RPM | Process |
|---|---|---|---|---|
| 1 | — | 40 | 77 | Load: Polymer, NDC |
| 1 | 60 | 40 | 77 | Ram Down Mixing |

TABLE 3-continued

Mixing Protocol (Truck Tread)

| Pass | Time (sec) | Temp (° C.) | RPM | Process |
|---|---|---|---|---|
| 1 | — | 40 | 77 | Load: Chemicals, Oil, 1/2 CB (blended) |
| 1 | 60 | 40 | 77 | Ram Down Mixing |
| 1 | — | 40 | 77 | Load: 1/2 CB (blended) |
| 1 | 60 | 40 | 77 | Ram Down Mixing |
| 1 | — | 40 | 77 | Sweep |
| 1 | 60 | 40 | 77 | Ram Down Mixing |
| 1 | ~300 | — | 77 | Discharge (130° C. Max - Slow RPM if necessary) |
| Mill: 70° C., 25:21 rpm, Gap 0.055-60" | | | | |
| 2 | — | 25 | 60 | Load: 1/2 MB, Curatives, 1/2 MB |
| 2 | 30 | 25 | 60 | Ram Down Mixing |
| 2 | 30 | 25 | 45 | Ram Down Mixing |
| 2 | — | 25 | 45 | Sweep |
| 2 | 120 | 25 | 45 | Ram Down Mixing |
| 2 | ~180 | — | 45 | Discharge (100° C. Max) |
| Mill: 70° C., 25:21 rpm, Gap 0.055-60" | | | | |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A polymer composition comprising: (I) a polymer; (II) a nanocellulose dispersion composition (NDC) comprising (i) a partitioning agent comprising a carbon black filler, an elastomer latex, a wax, or any combination thereof, and (ii) a nanocellulose; and (III) a carbon black additive.

Aspect 2. The polymer composition defined in aspect 1, wherein a weight ratio of the polymer to the nanocellulose dispersion composition (polymer:NDC) is in a range from about 100:1 to about 1:1.

Aspect 3. The polymer composition defined in aspect 1, wherein a weight ratio of the polymer to the nanocellulose dispersion composition (polymer:NDC) is in a range from about 50:1 to about 2:1.

Aspect 4. The polymer composition defined in any one of aspects 1-3, wherein the polymer comprises a thermoplastic.

Aspect 5. The polymer composition defined in any one of aspects 1-3, wherein the polymer comprises an elastomer.

Aspect 6. The polymer composition defined in any one of aspects 1-3, wherein the polymer comprises a natural rubber (NR), an epoxidized natural rubber (ENR), a synthetic cis-polyisoprene (IR), an emulsion styrene butadiene rubber (eSBR), a solution styrene butadiene rubber (sSBR), a polybutadiene rubber (BR), a butyl rubber (IIR/CIIR/BIIR), a chloroprene rubber (CR), a nitrile elastomer (NBR), a hydrogenated nitrile elastomer (HNBR), a carboxylated nitrile elastomer (XNBR), an ethylene propylene rubber (EPM/EPDM), a fluoroelastomer (FPM/FKM), a polyurethane rubber (AU/EU/PU), or any combination thereof.

Aspect 7. The polymer composition defined in any one of aspects 1-6, wherein the partitioning agent is compatible with the polymer and reduces nanocellulose agglomeration.

Aspect 8. The polymer composition defined in any one of aspects 1-7, wherein the nanocellulose dispersion composition has greater nanocellulose dispersibility in the polymer composition than that of the nanocellulose without the partitioning agent.

Aspect 9. The polymer composition defined in any one of aspects 1-8, wherein the nanocellulose comprises nanocellulose crystals (NC), nanocellulose fibrils (NF), or a combination thereof.

Aspect 10. The polymer composition defined in any one of aspects 1-9, wherein the nanocellulose comprises lignin-coated nanocellulose crystals (LCNC), lignin-coated nanocellulose fibrils (LCNF), or a combination thereof.

Aspect 11. The polymer composition defined in any one of aspects 1-10, wherein the nanocellulose comprises hydrophilic cellulose nanocellulose crystals (CNC), hydrophilic cellulose nanocellulose fibrils (CNF), or a combination thereof.

Aspect 12. The polymer composition defined in any one of aspects 1-11, wherein the nanocellulose dispersion composition (NDC) further comprises a hydrocarbon oil.

Aspect 13. The polymer composition defined in aspect 12, wherein the hydrocarbon oil comprises an aliphatic hydrocarbon, an aromatic hydrocarbon, or a combination thereof.

Aspect 14. The polymer composition defined in aspect 12, wherein the hydrocarbon oil comprises a treated distillate aromatic extract (TDAE) oil.

Aspect 15. The polymer composition defined in any one of aspects 1-14, wherein the elastomer latex comprises a natural rubber (NR), an isoprene rubber (IR), an emulsion styrene-butadiene rubber (ESBR), or any combination thereof.

Aspect 16. The polymer composition defined in any one of aspects 1-15, wherein the wax comprises a non-branched alkane paraffin wax; a natural mineral, petroleum refined, or lignin refined branched paraffin wax or ceresine wax; a polyethylene wax; a functionalized polyethylene wax; or any combination thereof.

Aspect 17. The polymer composition defined in any one of aspects 1-16, wherein the carbon black filler and the carbon black additive independently comprise a furnace carbon black and/or a surface-modified furnace carbon black.

Aspect 18. The polymer composition defined in any one of aspects 1-17, wherein the carbon black filler and the carbon black additive are independently characterized by: a nitrogen surface area of from about 90 $m^2/g$ to about 140 $m^2/g$; an external surface area of from about 80 $m^2/g$ to about 125 $m^2/g$; a pH of from about 2.5 to about 4; a 50 GM void volume of from about 55 $cm^3/100$ g to about 67 $cm^3/100$ g; a 75 GM void volume of from about 50 $cm^3/100$ g to about 60 $cm^3/100$ g; a 100 GM void volume of from about 45 $cm^3/100$ g to about 55 $cm^3/100$ g; a moisture content of from about 2.5 wt. % to about 4.5 wt. %; a volatile content of from about 4.5 wt. % to about 6.5 wt. %; an oxygen content of from about 2.5 wt. % to about 5.5 wt. %; or any combination thereof.

Aspect 19. The polymer composition defined in any one of aspects 1-18, wherein the partitioning agent comprises the carbon black filler, the elastomer latex, or the wax.

Aspect 20. The polymer composition defined in any one of aspects 1-18, wherein the partitioning agent comprises at least two of the carbon black filler, the elastomer latex, and the wax.

Aspect 21. The polymer composition defined in any one of aspects 1-20, wherein a weight ratio of the partitioning agent to the nanocellulose is in a range from about 0.5:1 to about 25:1.

Aspect 22. The polymer composition defined in any one of aspects 1-21, wherein a weight ratio of the partitioning agent to the nanocellulose is in a range from about 1:1 to about 10:1.

Aspect 23. The polymer composition defined in any one of aspects 1-22, wherein the nanocellulose dispersion composition (NDC) is produced by process comprising: (a) combining an aqueous dispersion of the nanocellulose with the partitioning agent to form a mixture; and (b) drying the mixture to form the nanocellulose dispersion composition (NDC).

Aspect 24. The polymer composition defined in any one of aspects 1-22, wherein the nanocellulose dispersion composition (NDC) is produced by process comprising: (A) combining an aqueous dispersion of the nanocellulose with the partitioning agent to form a mixture; and (B) drying the mixture to form the nanocellulose dispersion composition (NDC); wherein the partitioning agent is stable in the NDC and is spaced between nanocellulose particles to reduce or prevent agglomeration of the nanocellulose particles in the NDC.

Aspect 25. A process for partitioning a nanocellulose in an aqueous system for improved dispersibility in polymers, the process comprising: (a) combining an aqueous dispersion of the nanocellulose with a partitioning agent to form a mixture, wherein the partitioning agent comprises a carbon black filler; and (b) drying the mixture to form a nanocellulose dispersion composition (NDC).

Aspect 26. A process for partitioning a nanocellulose in an aqueous system with a partitioning agent, the process comprising: (A) combining an aqueous dispersion of the nanocellulose with the partitioning agent to form a mixture, wherein the partitioning agent comprises a carbon black filler; and (B) drying the mixture to form a nanocellulose dispersion composition (NDC); wherein the partitioning agent is stable in the NDC and is spaced between nanocellulose particles to reduce or prevent agglomeration of the nanocellulose particles in the NDC.

Aspect 27. The process defined in aspect 25 or 26, wherein a weight ratio of the partitioning agent to the nanocellulose is in a range from about 0.5:1 to about 25:1.

Aspect 28. The process defined in aspect 25 or 26, wherein a weight ratio of the partitioning agent to the nanocellulose is in a range from about 1:1 to about 10:1.

Aspect 29. The process defined in any one of aspects 25-28, wherein the nanocellulose comprises nanocellulose crystals (NC), nanocellulose fibrils (NF), or a combination thereof.

Aspect 30. The process defined in any one of aspects 25-29, wherein the nanocellulose comprises lignin-coated nanocellulose crystals (LCNC), lignin-coated nanocellulose fibrils (LCNF), or a combination thereof.

Aspect 31. The process defined in any one of aspects 25-30, wherein the nanocellulose comprises hydrophilic cellulose nanocellulose crystals (CNC), hydrophilic cellulose nanocellulose fibrils (CNF), or a combination thereof.

Aspect 32. The process defined in any one of aspects 25-31, wherein the partitioning agent further comprises an elastomer latex, a wax, or a combination thereof.

Aspect 33. The process defined in any one of aspects 25-32, wherein the aqueous dispersion of the nanocellulose is combined with the partitioning agent and a hydrocarbon oil.

Aspect 34. The process defined in aspect 33, wherein the hydrocarbon oil comprises an aliphatic hydrocarbon, an aromatic hydrocarbon, or a combination thereof.

Aspect 35. The process defined in aspect 33, wherein the hydrocarbon oil comprises a treated distillate aromatic extract (TDAE) oil.

Aspect 36. The process defined in any one of aspects 32-35, wherein the elastomer latex comprises a natural rubber (NR), an isoprene rubber (IR), an emulsion styrene-butadiene rubber (ESBR), or any combination thereof.

Aspect 37. The process defined in any one of aspects 32-36, wherein the wax comprises a non-branched alkane paraffin wax; a natural mineral, petroleum refined, or lignin refined branched paraffin wax or ceresine wax; a polyethylene wax; a functionalized polyethylene wax; or any combination thereof.

Aspect 38. The process defined in any one of aspects 25-37, wherein the carbon black filler comprises a furnace carbon black and/or a surface-modified furnace carbon black.

Aspect 39. The process defined in any one of aspects 25-38, wherein the carbon black filler is characterized by: a nitrogen surface area of from about 90 $m^2/g$ to about 140 $m^2/g$; an external surface area of from about 80 $m^2/g$ to about 125 $m^2/g$; a pH of from about 2.5 to about 4; a 50 GM void volume of from about 55 $cm^3/100$ g to about 67 $cm^3/100$ g; a 75 GM void volume of from about 50 $cm^3/100$ g to about 60 $cm^3/100$ g; a 100 GM void volume of from about 45 $cm^3/100$ g to about 55 $cm^3/100$ g; a moisture content of from about 2.5 wt. % to about 4.5 wt. %; a volatile content of from about 4.5 wt. % to about 6.5 wt. %; an oxygen content of from about 2.5 wt. % to about 5.5 wt. %; or any combination thereof.

Aspect 40. A nanocellulose dispersion composition (NDC) produced by the process defined in any one of aspects 25-39.

Aspect 41. A nanocellulose dispersion composition (NDC) comprising: (i) a partitioning agent comprising a carbon black filler; and (ii) a nanocellulose.

Aspect 42. The composition defined in aspect 40 or 41, wherein the partitioning agent is compatible with a polymer and reduces nanocellulose agglomeration.

Aspect 43. The composition defined in any one of aspects 40-42, wherein the nanocellulose dispersion composition has greater nanocellulose dispersibility in a polymer formulation than that of the nanocellulose without the partitioning agent.

Aspect 44. The composition defined in any one of aspects 40-43, wherein the nanocellulose comprises nanocellulose crystals (NC), nanocellulose fibrils (NF), or a combination thereof.

Aspect 45. The composition defined in any one of aspects 40-44, wherein the nanocellulose comprises lignin-coated nanocellulose crystals (LCNC), lignin-coated nanocellulose fibrils (LCNF), or a combination thereof.

Aspect 46. The composition defined in any one of aspects 40-45, wherein the nanocellulose comprises hydrophilic cellulose nanocellulose crystals (CNC), hydrophilic cellulose nanocellulose fibrils (CNF), or a combination thereof.

Aspect 47. The composition defined in any one of aspects 40-46, wherein the partitioning agent further comprises an elastomer latex, a wax, or a combination thereof.

Aspect 48. The composition defined in any one of aspects 40-47, wherein the nanocellulose dispersion composition (NDC) further comprises a hydrocarbon oil.

Aspect 49. The composition defined in aspect 48, wherein the hydrocarbon oil comprises an aliphatic hydrocarbon, an aromatic hydrocarbon, or a combination thereof.

Aspect 50. The composition defined in aspect 48, wherein the hydrocarbon oil comprises a treated distillate aromatic extract (TDAE) oil.

Aspect 51. The composition defined in any one of aspects 47-50, wherein the elastomer latex comprises a natural rubber (NR), an isoprene rubber (IR), an emulsion styrene-butadiene rubber (ESBR), or any combination thereof.

19

Aspect 52. The composition defined in any one of aspects 47-51, wherein the wax comprises a non-branched alkane paraffin wax; a natural mineral, petroleum refined, or lignin refined branched paraffin wax or ceresine wax; a polyethylene wax; a functionalized polyethylene wax; or any combination thereof.

Aspect 53. The composition defined in any one of aspects 40-52, wherein the carbon black filler comprises a furnace carbon black and/or a surface-modified furnace carbon black.

Aspect 54. The composition defined in any one of aspects 40-53, wherein the carbon black filler is characterized by: a nitrogen surface area of from about 90 $m^2$/g to about 140 $m^2$/g; an external surface area of from about 80 $m^2$/g to about 125 $m^2$/g; a pH of from about 2.5 to about 4; a 50 GM void volume of from about 55 $cm^3$/100 g to about 67 $cm^3$/100 g; a 75 GM void volume of from about 50 $cm^3$/100 g to about 60 $cm^3$/100 g; a 100 GM void volume of from about 45 $cm^3$/100 g to about 55 $cm^3$/100 g; a moisture content of from about 2.5 wt. % to about 4.5 wt. %; a volatile content of from about 4.5 wt. % to about 6.5 wt. %; an oxygen content of from about 2.5 wt. % to about 5.5 wt. %; or any combination thereof.

Aspect 55. The composition defined in any one of aspects 40-54, wherein a weight ratio of the partitioning agent to the nanocellulose is in a range from about 0.5:1 to about 25:1.

Aspect 56. The composition defined in any one of aspects 40-55, wherein a weight ratio of the partitioning agent to the nanocellulose is in a range from about 1:1 to about 10:1.

Aspect 57. A polymer composition comprising: (I) a polymer; and (II) the nanocellulose dispersion composition (NDC) defined in any one of aspects 40-56.

Aspect 58. The polymer composition defined in aspect 57, wherein a weight ratio of the polymer to the nanocellulose dispersion composition (polymer:NDC) is in a range from about 100:1 to about 1:1.

Aspect 59. The polymer composition defined in aspect 57, wherein a weight ratio of the polymer to the nanocellulose dispersion composition (polymer:NDC) is in a range from about 50:1 to about 2:1.

Aspect 60. The polymer composition defined in any one of aspects 57-59, wherein the polymer comprises a thermoplastic.

Aspect 61. The polymer composition defined in any one of aspects 57-59, wherein the polymer comprises an elastomer.

Aspect 62. The polymer composition defined in any one of aspects 57-59, wherein the polymer comprises a natural rubber (NR), an epoxidized natural rubber (ENR), a synthetic cis-polyisoprene (IR), an emulsion styrene butadiene rubber (eSBR), a solution styrene butadiene rubber (sSBR), a polybutadiene rubber (BR), a butyl rubber (IIR/CIIR/BIIR), a chloroprene rubber (CR), a nitrile elastomer (NBR), a hydrogenated nitrile elastomer (HNBR), a carboxylated nitrile elastomer (XNBR), an ethylene propylene rubber (EPM/EPDM), a fluoroelastomer (FPM/FKM), a polyurethane rubber (AU/EU/PU), or any combination thereof.

Aspect 63. The polymer composition defined in any one of aspects 57-62, wherein the polymer composition further comprises a carbon black additive.

Aspect 64. The composition or process defined in any one of the preceding aspects, wherein the polymer composition, and/or the NDC, and/or the partitioning agent does not comprise a carbon black material (e.g., a carbon black additive or a carbon black filler).

20

What is claimed is:

1. A polymer composition comprising:
(I) a polymer;
(II) a nanocellulose dispersion composition (NDC) comprising:
(i) a partitioning agent comprising a carbon black filler and at least one of an elastomer latex and/or a wax; and
(ii) a nanocellulose; and
(III) a carbon black additive.

2. The polymer composition of claim 1, wherein:
a weight ratio of the polymer to the nanocellulose dispersion composition (polymer: NDC) is in a range from about 100:1 to about 1:1; and
a weight ratio of the partitioning agent to the nanocellulose is in a range from about 0.5:1 to about 25:1.

3. The polymer composition of claim 1, wherein the polymer comprises an elastomer.

4. The polymer composition of claim 1, wherein the nanocellulose dispersion composition has greater nanocellulose dispersibility in the polymer composition than that of the nanocellulose without the partitioning agent.

5. The polymer composition of claim 1, wherein the nanocellulose comprises nanocellulose crystals (NC), nanocellulose fibrils (NF), or a combination thereof.

6. The polymer composition of claim 1, wherein the nanocellulose comprises lignin-coated nanocellulose crystals (LCNC), lignin-coated nanocellulose fibrils (LCNF), or a combination thereof.

7. The polymer composition of claim 1, wherein the nanocellulose comprises hydrophilic cellulose nanocellulose crystals (CNC), hydrophilic cellulose nanocellulose fibrils (CNF), or a combination thereof.

8. The polymer composition of claim 1, wherein the nanocellulose dispersion composition (NDC) further comprises a hydrocarbon oil.

9. The polymer composition of claim 1, wherein:
the elastomer latex comprises a natural rubber (NR), an isoprene rubber (IR), an emulsion styrene-butadiene rubber (ESBR), or any combination thereof;
the wax comprises a non-branched alkane paraffin wax; a natural mineral, petroleum refined, or lignin refined branched paraffin wax or ceresine wax; a polyethylene wax; a functionalized polyethylene wax; or any combination thereof; and
the carbon black filler and the carbon black additive independently comprise a furnace carbon black and/or a surface-modified furnace carbon black.

10. The polymer composition of claim 1, wherein the carbon black filler and the carbon black additive are independently characterized by:
a nitrogen surface area of from about 90 $m^2$/g to about 140 $m^2$/g;
an external surface area of from about 80 $m^2$/g to about 125 $m^2$/g;
a pH of from about 2.5 to about 4;
a 50 GM void volume of from about 55 $cm^3$/100 g to about 67 $cm^3$/100 g;
a 75 GM void volume of from about 50 $cm^3$/100 g to about 60 $cm^3$/100 g;
a 100 GM void volume of from about 45 $cm^3$/100 g to about 55 $cm^3$/100 g;
a moisture content of from about 2.5 wt. % to about 4.5 wt. %;
a volatile content of from about 4.5 wt. % to about 6.5 wt. %;

an oxygen content of from about 2.5 wt. % to about 5.5 wt. %; or any combination thereof.

11. The polymer composition of claim 1, wherein the partitioning agent comprises the carbon black filler, the elastomer latex, and the wax.

12. A process for partitioning a nanocellulose in an aqueous system for improved dispersibility in polymers, the process comprising:
(a) combining an aqueous dispersion of the nanocellulose with a partitioning agent to form a mixture, wherein the partitioning agent comprises a carbon black filler and at least one of an elastomer latex and/or a wax; and
(b) drying the mixture to form a nanocellulose dispersion composition (NDC).

13. The process of claim 12, wherein the partitioning agent comprises the carbon black filler, the elastomer later, and the wax.

14. The process of claim 12, wherein the aqueous dispersion of the nanocellulose is combined with the partitioning agent and a hydrocarbon oil.

15. A nanocellulose dispersion composition (NDC) comprising:
(i) a partitioning agent comprising a carbon black filler and at least one of an elastomer latex and/or a wax; and
(ii) a nanocellulose.

16. The composition of claim 15, wherein the nanocellulose dispersion composition has greater nanocellulose dispersibility in a polymer formulation than that of the nanocellulose without the partitioning agent.

17. The composition of claim 15, wherein the partitioning agent comprises the carbon black filler, the elastomer later, and the wax.

18. The composition of claim 15, wherein the nanocellulose dispersion composition (NDC) further comprises a hydrocarbon oil.

19. A polymer composition comprising:
(I) a polymer; and
(II) the nanocellulose dispersion composition (NDC) of claim 15.

20. The composition of claim 17, wherein the elastomer latex comprises a natural rubber (NR), an isoprene rubber (IR), an emulsion styrene-butadiene rubber (ESBR), or any combination thereof.

21. The composition of claim 17, wherein the wax comprises a non-branched alkane paraffin wax; a natural mineral, petroleum refined, or lignin refined branched paraffin wax or ceresine wax; a polyethylene wax; a functionalized polyethylene wax; or any combination thereof.

22. The composition of claim 18, wherein the hydrocarbon oil comprises an aliphatic hydrocarbon, an aromatic hydrocarbon, or a combination thereof.

23. The composition of claim 18, wherein the hydrocarbon oil comprises a treated distillate aromatic extract (TDAE) oil.

24. The composition of claim 15, wherein a weight ratio of the partitioning agent to the nanocellulose is in a range from about 0.5:1 to about 25:1.

25. The composition of claim 24, wherein:
the partitioning agent comprises the carbon black filler, the elastomer later, and the wax; and
the nanocellulose dispersion composition (NDC) further comprises a hydrocarbon oil.

26. The composition of claim 25, wherein the carbon black filler comprises a furnace carbon black and/or a surface-modified furnace carbon black.

27. The composition of claim 25, wherein the nanocellulose comprises nanocellulose crystals (NC), nanocellulose fibrils (NF), or a combination thereof.

28. The composition of claim 25, wherein the nanocellulose comprises lignin-coated nanocellulose crystals (LCNC), lignin-coated nanocellulose fibrils (LCNF), or a combination thereof.

29. The composition of claim 25, wherein the nanocellulose comprises hydrophilic cellulose nanocellulose crystals (CNC), hydrophilic cellulose nanocellulose fibrils (CNF), or a combination thereof.

30. A polymer composition comprising:
(I) a polymer; and
(II) the nanocellulose dispersion composition (NDC) of claim 25;
wherein a weight ratio of the polymer to the nanocellulose dispersion composition (polymer:NDC) is in a range from about 100:1 to about 1:1.

* * * * *